United States Patent [19]
Omonishi

[11] 3,800,661
[45] Apr. 2, 1974

[54] APPARATUS FOR CUTTING SIDE SEAL GROOVES IN ROTORS OF ROTARY PISTON ENGINE

[76] Inventor: Shitomi Omonishi, No. 7-25-2-chome, Yoshijima-Nishi, Japan

[22] Filed: Mar. 19, 1973

[21] Appl. No.: 342,550

[52] U.S. Cl. ............................. 90/31, 83/5, 90/55, 408/54
[51] Int. Cl. ....... B23d 5/00, B23d 1/26, B23d 13/06
[58] Field of Search .................. 83/5; 90/30, 31, 55; 408/54

[56] References Cited
UNITED STATES PATENTS
2,326,922  8/1943  Bieler ...................................... 90/55
FOREIGN PATENTS OR APPLICATIONS
1,269,455  5/1968  Germany ............................. 408/54

Primary Examiner—Francis S. Husar
Attorney, Agent, or Firm—Fleit, Gipple & Jacobson

[57] ABSTRACT

Herein disclosed is an apparatus for forming a long groove in a workpiece between relief spaces having such a limited length as barely receives a cutting tool. A method, which is exemplified in the apparatus, cyclically comprises, as customary, the feeding, drawing, quickly returning, depth feeding and inserting steps, but is featured by the manners in which the drawing and inserting operations are carried out. That is, the cutting tool is drawn from one of the relief spaces at a final stage of the feeding step along a guide line, which is slightly inclined with respect to a line perpendicular to the long groove to be cut, so that the combined angle of drawal is substantially perpendicular to the long groove. And, the cutting tool is also inserted into the other of the relief spaces at a final stage of the returning step along the particular guide line, so that the combined angle of insertion is also substantially perpendicular to the long groove. As a result, a long groove is efficiently produced with acceptable accuracy even if the relief spaces have such a limited length as admits the cutting tool with a limited play in the feeding direction of the cutting tool.

14 Claims, 15 Drawing Figures

3,800,661

APPARATUS FOR CUTTING SIDE SEAL GROOVES IN ROTORS OF ROTARY PISTON ENGINE

BACKGROUND OF THE INVENTION

The present invention relates to a production machine tool for cutting grooves, and more particularly to an apparatus for forming arcuately long grooves, such as side seal grooves of a two-lobed rotor of a rotary piston engine, in a workpiece between relief spaces having such a limited length as barely receives a cutting tool.

When it is intended to cut an arcuately long side seal groove having a depth of about 5.0 mm in a two-lobed rotor of a rotary piston engine, a cutting tool, if it has a depth of cut of about 0.05 mm, is required to repeat its cutting operation about one hundred times. From the resultant sealing effect consideration, moreover, the cutting operation itself should be performed with high accuracy. Before the cutting operation, on the other hand, two relief spaces are, as is well known in the art, formed at the both ends of the side seal groove to be cut, respectively for insertion and drawal purposes of the cutting tool. In order to ensure accuracy of the cutting operation, however, those relief spaces are allowed to have such a limited length as barely receives the cutting tool, in other words, as admits the same with a limited play in the feeding direction of the cutting tool. As a result, there arises a serious problem in that it is quite difficult, although not impossible, to quickly insert and draw the cutting tool into and out of the relief spaces, with acceptable accuracy over a number of the cutting cycles, as mentioned above. This problem will accordingly turn it difficult to efficiently cut such an arcuately long groove with allowable accuracy.

SUMMARY OF THE INVENTION

It is, therefore, a primary object of the present invention to provide an apparatus, without the above-mentioned disadvantage, for efficiently and accurately forming a long groove in a workpiece between relief spaces having such a limited length as barely receives a cutting tool.

Another object of the present invention is to provide an apparatus for continuously forming a plurality of arcuately long grooves in a workpiece, such as a two-lobed rotor of a rotary piston engine, between paired relief spaces having such a limited length as admits a cutting tool with a limited play in the feeding direction of the cutting tool.

According to a feature of the method of the invention, the cutting tool is drawn from one of the relief spaces at a final stage of the feeding step to be cut, along a guide line which is slightly inclined with respect to a line perpendicular to the long groove to be cut, so that the combined angle of drawal is substantially perpendicular to the long groove.

According to another feature, the cutting tool is also inserted into the other of the relief spaces at a final stage of the returning step along the slightly inclined guide line, so that the combined angle of insertion is also substantially perpendicular to the long groove.

BRIEF DESCRIPTION OF THE DRAWINGS

Other objects and advantages of the present invention will be more apparent from the detailed description taken in connection with the accompanying drawings, in which.

PREFERRED EMBODIMENTS OF THE INVENTION

Figure 1:
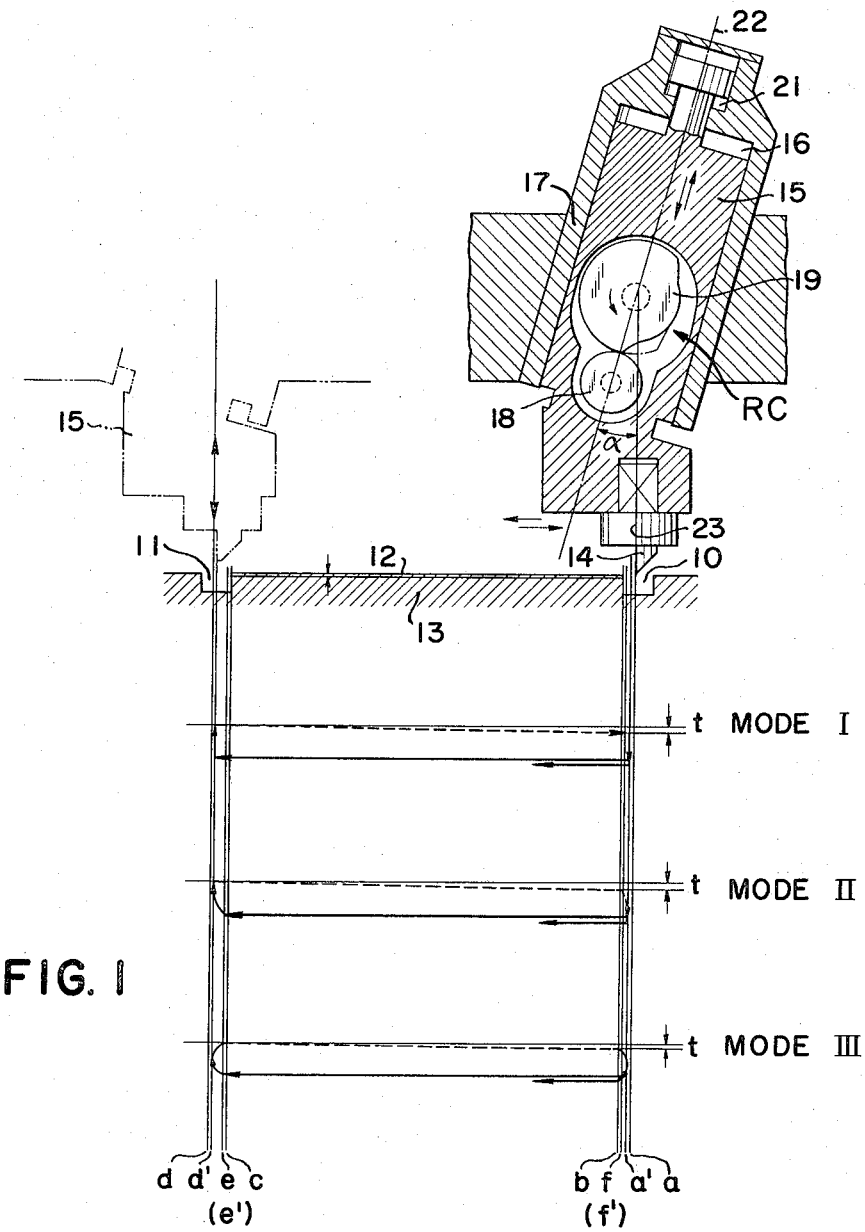
FIG. 1 is an illustrative view showing three modes of the cutting cycle as exemplified in the method and apparatus according to the present invention.

Three modes of operation will now be described with reference to FIGS. 1 to 5. When relief spaces 10, 11 located at the both ends of a relatively long groove 12 of a workpiece 13 to be cut are so narrow as to scarcely admit the cutting blade of a cutting tool 14, the first mode (I) of cutting operation is effectively employed, in which the cutting tool 14 is inserted into and drawn out of the relief spaces 10, 11 substantially perpendicularly of the groove 12 or the outer surface of the workpiece 13. More specifically, the cutting tool 14 is carried by a tool main body 15 which in turn is slidably received within a bore 16 of a tool head 17. This tool head 17 is moved back and forth along the groove 12 in cutting contact with the outer surface of the workpiece 13. The cutting tool 14 is movable integrally with the main body 15 and tool head 17 between the initial position of work or cut stroke and the final position of work stroke or the initial position of return stroke. These two positions for initiation of the work and return strokes are shown, respectively, in a solid line and in a phantom line, as seen from FIG. 1. The cut and return strokes are effected by the use of the conventional Whitworth quick-return mechanism QR, the operation of which will be described in connection with FIGS. 2 and 3.

In the tool head 17 is also provided a rotary cam mechanism RC which is accommodated in the tool main body 15 so as to insert and draw the cutting tool 14 for operation. The cam mechanism RC includes a pressure member or cam follower 18 journaled to the main body 15, and a rotary cam 19 journaled to the tool head 17 for forcedly moving the cutting tool 14 toward and away from the workpiece 13 through the cam follower 18 and main body 15. The cam mechanism RC is also provided with a tool pressing or stabilizing cylinder 21 which is disposed at the opposite end of the tool head 17 for biasing the cam follower 18 toward the rotary cam 19 and at the same time for hydraulically dissipating the vibrations, if any, of the cutting tool 14.

In accordance with the gist of the present invention, the cutting tool 14 is forcedly moved at its initial positions of the cut and return strokes substantially perpendicularly of the outer surface of the workpiece 13. For this particular purpose, the central or guide axis, as indicated at numeral 22, of the bore 16 of the tool head 17 is slightly inclined at a predetermined angle $\alpha$ with respect to the normal line 23 of the workpiece surface. It should be noted that the value of the angle $\alpha$ is determined by consideration of the vector relationships between the insertion velocity and the return velocity and between the withdrawal velocity and the cutting velocity. Since, as will be explained in more detail with reference to FIGS. 2 to 5, the cyclic rotation of the rotary cam 19 is correctly synchronized with the feed and return strokes of the cutting tool 14, the interaction of the acting surface of the cam 19 with the follower 18 will assure the perpendicular insertion of the tool 14 at its initial position of the work stroke and the perpendicular withdrawal of the tool 14 at its initial position of the return stroke.

Depth of cut is, on the other hand, controlled for each cyclic movement of the cutting tool 14 by a cutting depth control mechanism CD, the detailed discussion of which will be made with reference to FIGS. 6 and 11. Feeding of this depth is carried out by making the tool head 17 and workpiece 13 approach to each other by a predetermined distance $t$ during the quick return stroke of the cutting tool 14.

Close attention will be paid to the lower portion of FIG. 1, in which reference characters $a, a', b, c, d, d', e, e', f$ and $f'$ represent the following positions of the cutting blade of the tool 14:

$a$ — Initial position of the whole cutting operation;
$a'$ — Initial position of work or feed stroke;
$b$ — Initial position of cutting stroke;
$c$ — Terminal position of cutting stroke;
$d$ — Terminal position of work or feed stroke;
$d'$ — Terminal position of the whole cutting operation;
$e$ — Initial position of tool withdrawal;
$e'$ — Terminal position of tool withdrawal;
$f$ — Initial position of tool insertion; and
$f'$ — Terminal position of tool insertion With these positions thus named, the cutting tool 14 is fed leftwardly of the drawing along the solid line for the cut stroke and succeedingly returned rightwardly along the dotted line for the quick return stroke, as shown between the positions $a'$ and $d'$.

In accordance with the first mode (I), therefore, the cutting blade of the tool 14 is firstly placed at the position $a$ and subsequently moved leftwardly at a predetermined feed speed to the position $a'$. Then, the material in the groove 12 of the workpiece 13 is cut away by the depth $t$ while the tool 14 is fed leftwardly between the positions $b$ and $c$. While the tool 14 is subsequently moved from the position $d'$ to the position $d$, it is withdrawn at the predetermined angle $\alpha$, so that the leftward velocity due to the Whitworth mechanism QR is offset by the rightward velocity component of the inclined withdrawal due to the cam mechanism RC. This is reflected by the result that the tool 14 is drawn substantially perpendicularly of the workpiece surface from the relief space 11, as shown at the position $d'$. The withdrawal distance of the tool 14, on the other hand, is preset so sufficient as to return the tool from the position $d'$ to the position $a'$ with its blade edge being above the workpiece surface. It should be noted that during this return stroke the tool 14 is brought close to the workpiece surface by the distance $t$ for the succeeding cycle by the depth control mechanism CD. While, on the other hand, the tool is moved rightwardly from the position $a'$ to the position $a$, it is pushed into the relief space 10 at an inclination of the angle $\alpha$. As a result, the combination of the rightward velocity vector with the velocity vector of the leftwardly inclined insertion will produce substantially perpendicular insertion of the tool 14 into the space, as shown at the position $a'$. After having restored its original position $a'$, the tool 14 repeats its cutting cycle in the manner as described above. Thus, a relatively long groove of a desired depth is obtained, even when the relief spaces at its both ends are highly limited.

Figure 4:
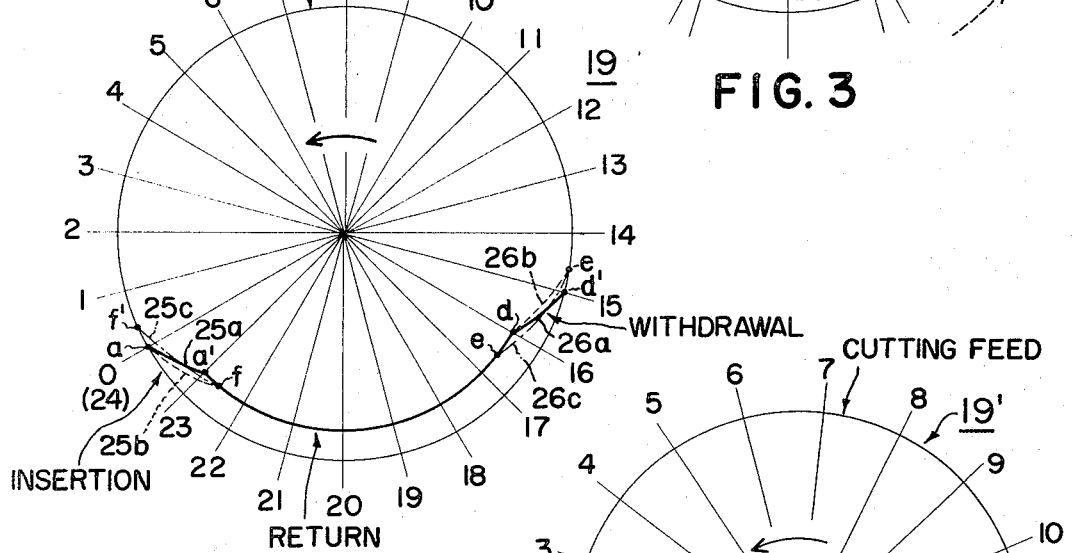
FIG. 4 is an enlarged view showing the acting surfaces of a rotary cam, as shown in FIG. 1, for cutting a linear groove.

Turning now to FIG. 4, the rotary cam 19 for cutting a linear groove has generally four acting-surface portions, namely, insertion, cutting feed, withdrawal, and return portions, as shown. In this figure, the reference numerals 0 to 24 designate angular velocities relative to the cam follower 18. The first mode (I) of cutting operation is carried out by resorting to an acting surface 25a for insertion and to an acting surface 26a for withdrawal. The rotation of the rotary cam 19 is synchronized with that of a gear 27 of the Whitworth quick-return mechanism QR, as will be described with reference to FIG. 3. In other words, the angular velocities 0 to 24 of the rotary cam 19 are varied in synchronism with and at the same speed as the corresponding angular velocities 0 to 24 of an operating roller 28 which is operatively connected to the gear 27. With these arrangements, the interactions of the acting surfaces 25a and 26a of the cam 19 with the peripheral surface of the cam follower 18 ensure the perpendicular insertion and withdrawal of the cutting tool with respect to the workpiece outer surface.

When, on the other hand, the length of the relief spaces 10, 11 can be preset slightly longer than the case of the first mode (I), then the cutting tool 14 is inserted and withdrawn not substantially perpendicularly but slightly obliquely into and out of the spaces 10, 11. This second mode (II) of operation follows the locus of FIG. 1 and should be appreciated in that its oblique insertion and withdrawal will allow the acting surfaces of the rotary cam 19 to be more smoothly flattened. As a result, wear and tear of the particular acting surface are decreased to prolong the life time of the cam 19. These acting surfaces are illustrated, by way of example, by two curves 25b and 26b of FIG. 4.

More smooth interactions between the rotary cam 19 and the cam follower 18 can be assured by acting surfaces 25c and 26c of FIG. 4, which will afford the locus of the third mode (III) as shown in FIG. 1. In this mode of operation, the blade edge of the cutting tool 14 draws arcuate line for both insertion and withdrawal.

Figure 5:
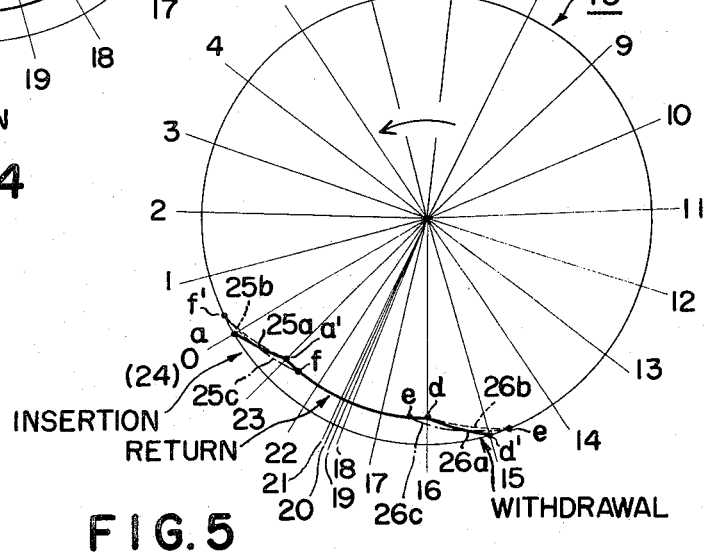
FIG. 5 is similar to FIG. 4 but shows the acting surfaces for cutting an arcuate groove.

The foregoing description is directed to the operational principle of the groove cutting machine, in which the relatively long groove is assumed linear for illustrative purposes only. However, the cutting machine of the invention can also be employed to form an arcuate groove. In this modification, the rotary cam 19' of FIG. 5 should be used from practical considerations. As shown, the lines 0 to 24 indicating the angular velocities of the rotary cam 19 are dense between lines 18 to 21. These lines 18 to 21 made highly close to each other come from consideration of effective angular discrepancy between the feed and return operations of the rotary cam 19. More specifically, when the cutting machine is intended to be used to form a side seal groove of a two-lobed rotor of a rotary piston engine, the rotational motion of the tool head 17 alternates its direction back and forth. As will be explained in more detail with reference to FIG. 6, on the other hand, the rotational motion of the rotary cam 19 is usually given by a transmission gear mechanism which has a driving shaft in the axis of rotation of the tool head 17. In this instance, the driving shaft rotates always in one direction which coincides with either of the backward or forward direction of the tool head proper. This will naturally invite that the effective angular velocity of the above driving shaft has different values in response to the directions of the tool head proper. Thus, the resultant angular deceleration of the rotary cam 19 during its returning operation is compensated by making the angular distances of the lines 18 to 21 dense, as shown in FIG. 5.

Figure 6:
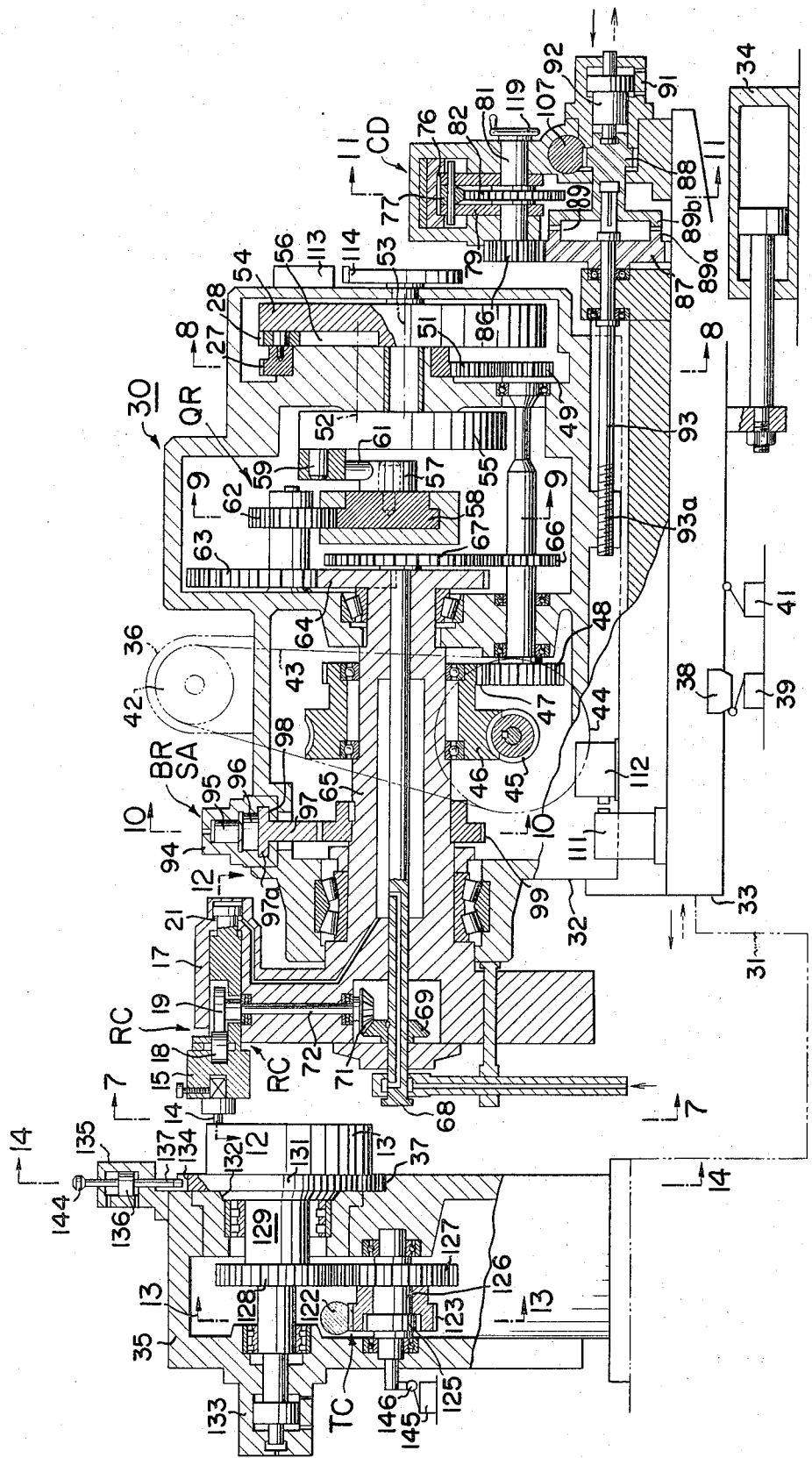
FIG. 6 is a side elevation of the whole construction of the apparatus of the present invention but shows in longitudinal section the essential portions thereof.
Figure 15:
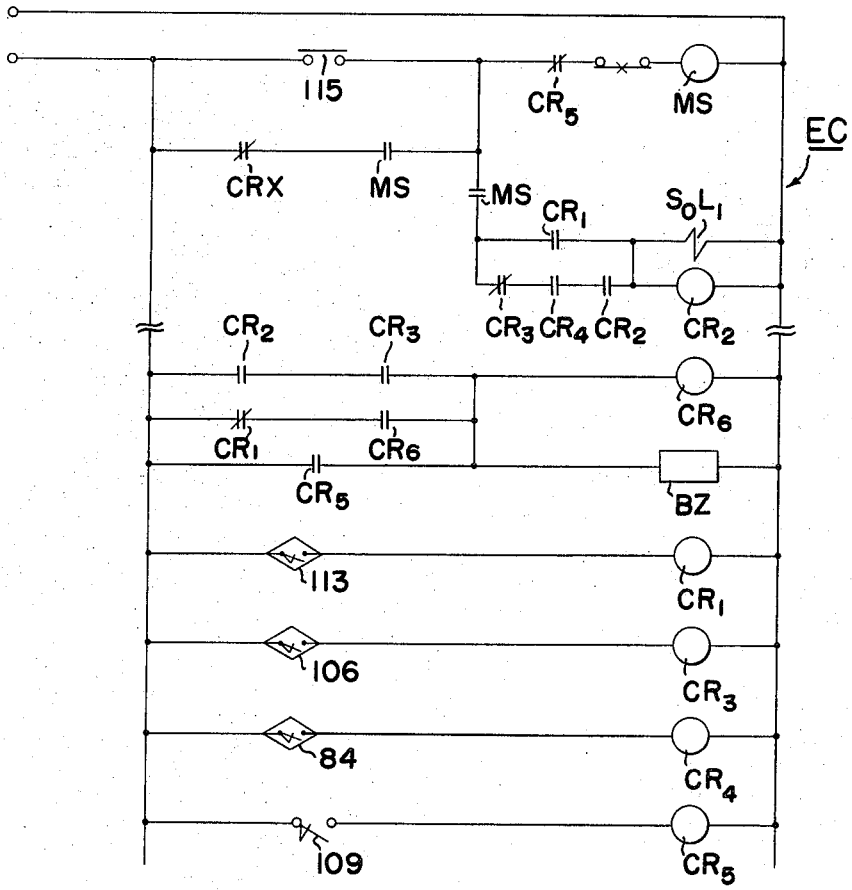
FIG. 15 shows an electric circuit for electrically controlling the operation of a cutting depth control mechanism as employed in the apparatus of FIG. 6.

Referring to FIGS. 6 and 15, the general construction and operation of the arcuate groove cutting machine according to the present invention will be described. The cutting machine, as generally indicated at numeral 30, is provided with a main body 31 on which a depth control table 32 carrying the tool head 17 is mounted through a quick approach table 33. This approach table 33 is quickly movable by the action of a quick approach cylinder 34 to bring the tool head 17 close to and apart from the workpiece 13 on a work head 35 before and after the cutting operation of the cutting machine 30.

Figure 2:
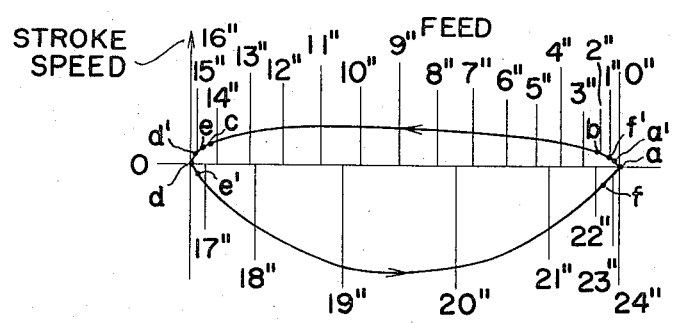
FIG. 2 is a graphic presentation of a stroke speed for all the cutting cycle of the tool head.
Figure 3:
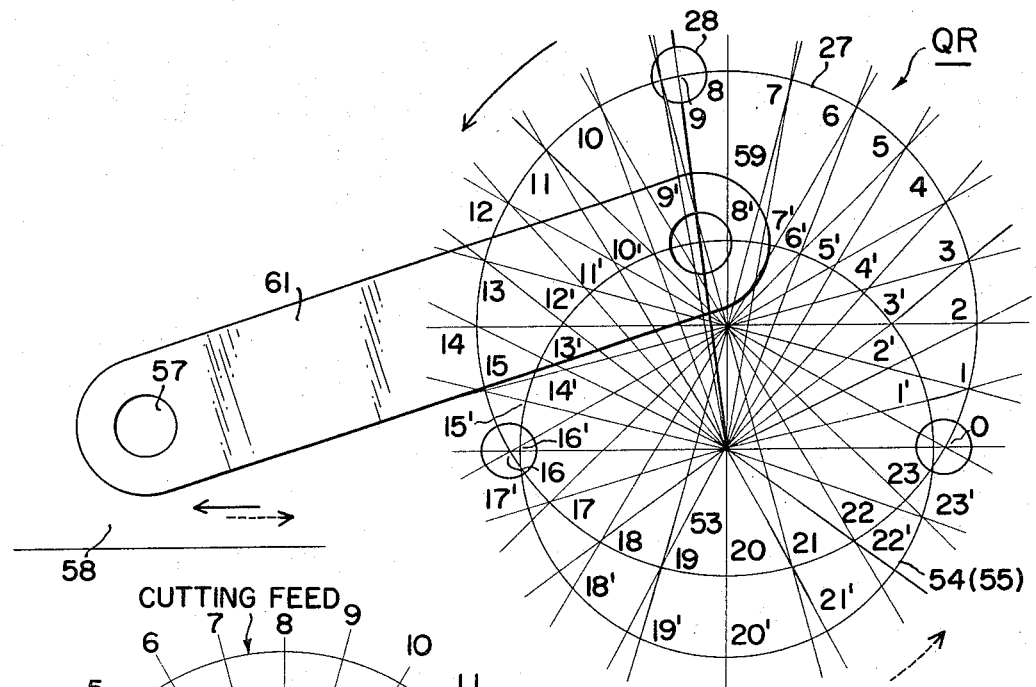
FIG. 3 is an illustrative view showing the operations of the Whitworth quick-return mechanism.
Figure 12:
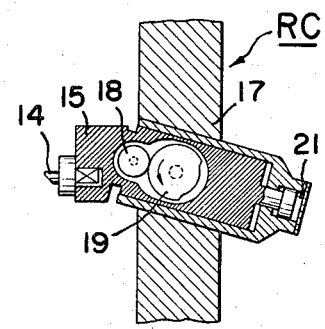
FIG. 12 is a longitudinal section taken along the line 12 — 12 of FIG. 6.
Figure 14:
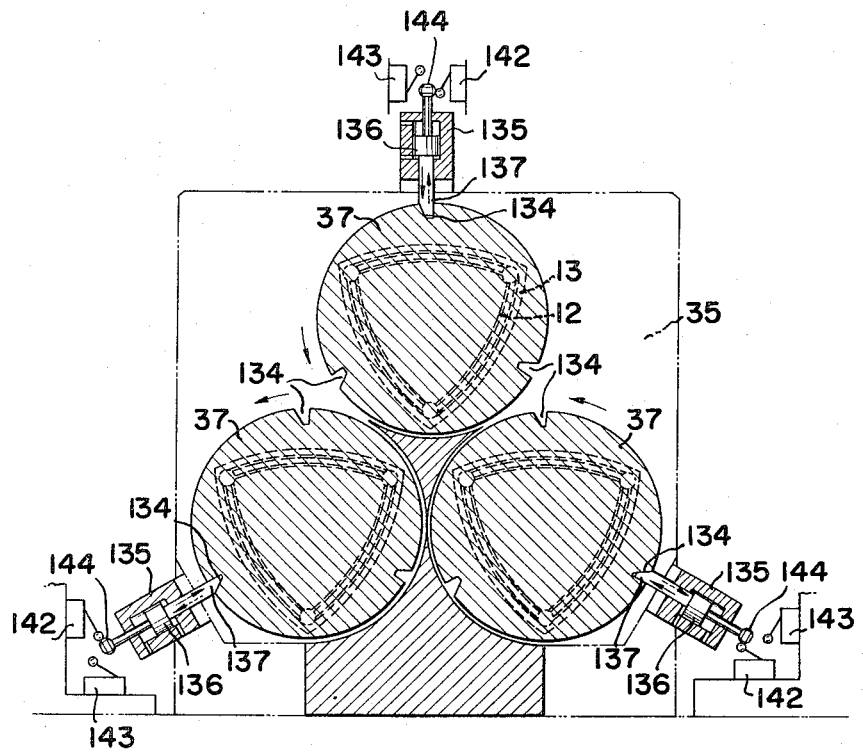
FIG. 14 is a cross-sectional view taken along the line 14 — 14 of FIG. 6.

On the depth control table 32 is mounted a prime mover or electric motor 36 having a constant speed for driving the Whitworth quick-return mechanism QR. The operation of this mechanism QR in turn initiates to effect the movement of the cutting tool 14 with such a stroke velocity as shown in FIG. 2. For practical purposes, the cutting machine 30 may preferably be provided with three similar tool heads, so that it can form at a time three arcuate grooves on the side surfaces of the rotors as illustrated in FIGS. 12 and 14. The rotary cam mechanism RC is also provided for bringing the cutting tool 14 into and out of the arcuate grooves 12 which are angularly spaced from each other by about 120°. During one cycle of the cutting operation, especially during the return stroke, the tool head 17 is moved toward the workpiece 13 by a depth $t$ by the action of the cutting depth control mechanism CD, which is shown at a lower right-hand corner of FIG. 6. Turning to the left-hand side of the same drawing, a rotary table dividing mechanism TC is also provided to turn a dividing table 37 and accordingly the workpiece 13 by about 120° for division, so that the relative position of the arcuate grooves 12 to the cutting tool 14 can be changed.

At the preparation stage of the cutting operation, the depth control table 32 is moved in the direction of the solid arrow up to its foremost position, in which the cutting tool 14 is in proximity to the workpiece outer surface just as shown in FIG. 6. At the final stage, on the other hand, the control table 32 takes its rearmost position after having been moved by the approach cylinder 34 in the direction of the dotted arrow. The displacement of the control table 32 between these two extreme positions is effected by a hydraulic control apparatus (not shown) having fluid communication with the approach cylinder 34. The operation of this control apparatus is controlled by a locating dog 38 which is mounted on the approach table 33 in a manner to cooperate with two limit switches 39, 41 for detecting the foremost and rearmost positions. For instance, when the control table 32 reaches the foremost position, the limit switch 39 is actuated by the locating dog 38 to thereby deenergize the not-shown control apparatus, so that the approach cylinder 34 stops the forward movement of the control table 32. At this very instant, the limit switch 39 may preferably energize the electric motor 36.

With the motor 36 thus rotated, the driving force is transmitted through a driving force transmitting mechanism (not numbered as a whole) to the Whitworth quick-return mechanism QR. This transmitting mechanism includes, as shown in FIG. 6, a drive pulley 42, a belt 43, a driven pulley 44, a worm 45 integral with the pulley 44, a worm gear 46 meshing with the worm 45, a drive gear 47 integral with the worm gear 46, a driven gear 48 meshing with the drive gear 47, a gear 49 integral with the driven gear 48 for effecting the rotational motion of the tool head 17, an intermediate idle gear 51, and the gear 27 of the quick-return mechanism QR. Thus, the driving force is transmitted by way of the above elements 27 and 42 to 51 of the transmitting mechanism in the order of the elements as enumerated above.

Figure 8:
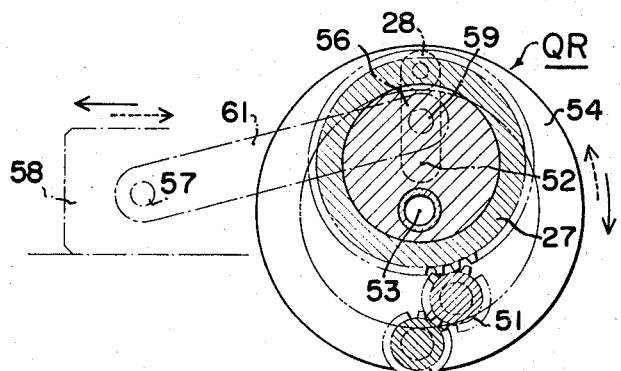
FIG. 8 is a cross-sectional view taken along the line 8 — 8 of FIG. 6.
Figure 9:
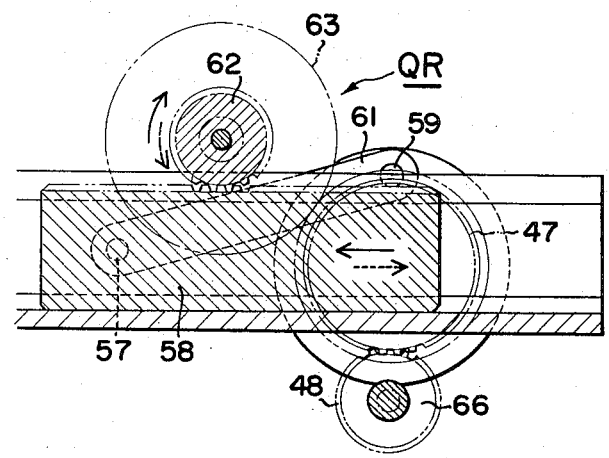
FIG. 9 is a cross-sectional view taken along the line 9 — 9 of FIG. 6.

As is well known in the art, since the axis of rotation 52 of the gear 27 is eccentric at a distance to an axis of rotation 53 of a speed varying disc 54, the operating roller 28 journaled to the gear 27 serves to turn the speed varying disc 54 together with a rotary disc 55 at a variable rotational speed by way of a guide slit 56 which is formed radially of the speed varying disc 54 for receiving the roller 28. MOre particularly, the rotational speed of the two discs 54, 55 has a relationship with the speed of the cutting feed of the tool head 17, while the roller 54 is moving above the axis of rotation 53 as shown in FIG. 6. The particular rotational speed dictates, on the contrary, the speed of return stroke with the roller 28 moving below the axis of rotation 53. The speed-varying rotation of the discs 54, 55 is then transmitted to a pin 57 of a linearly movable toothed rack 58 through a crank pin 59 and a crank 61. With these construction arrangements, the rack 58 is moved forwards in the direction of the solid arrow of FIGS. 3, 8 and 9 and backwards in the direction of the dotted arrow, both with the stroke speed as shown in FIG. 2. This reciprocating movements of the rack 58 is further transmitted through integral gears 62, 63 to a driven gear 64 secured to a hollow shaft 65 which carries the tool head 17. This causes cyclic back and forth rotation of the tool head 17 to thereby form an arcuate groove on the workpiece.

Description will now be made on the rotary cam mechanism RC with reference to FIG. 1, 6 and 12. The driving force of the electric motor 36 is bypassed at a depth control gear 66 which is integral with the gears 48, 49. This gear 66 is in meshing engagement with a driven gear 67 which is secured to one end of a driving shaft 68. This driving shaft 68 is rotatably received within the axial bore of the hollow shaft 65. Thus, the driving force is transmitted to a driving bevel gear 69 which is secured to the opposite end of the driving shaft 68. The bevel gear 69 meshes with a driven bevel gear 71 secured to one end of a cam shaft 72 which is in turn secured to the rotary cam 19. As a result, the driving force is finally given to the rotary cam 19 to thereby rotate the same unidirectionally, namely, in the direction of the arrow of FIG. 12. The resultant operations of the cam 19 and the associated members 14 to 18 were explained with reference to FIG. 1, 4 and 5, and the detailed discussion will be omitted here.

Figure 11:
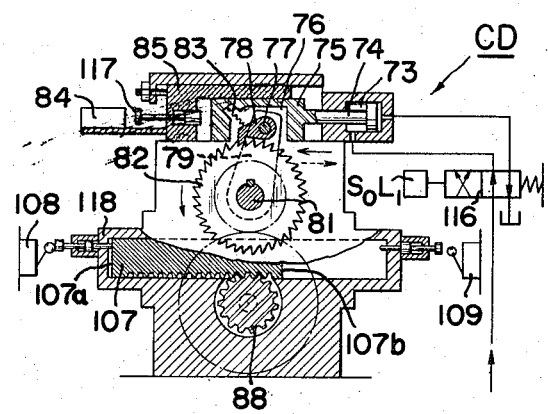
FIG. 11 is a cross-sectional view taken along the line 11 — 11 of FIG. 6.

Turning now to FIG. 11, the cutting depth control mechanism CD includes a depth control cylinder 73, within which a piston 74 is reciprocatively movably received. To this piston 74 is secured a sliding member 75 having a grooved portion 76 by which a support pin 77 of a ratchet pawl 78 is held. This pin 77 is in turn secured to a rocking arm 79 loosely engaging with a shaft 81 which is integral with a ratchet wheel 82, as shown. The ratchet pawl 78 is biased into engagement with the teeth of the ratchet wheel 82 by the action of a coil spring 83 which is held on the grooved portion 74 of the sliding member 75. With the piston 74 reciprocating, therefore, the ratchet wheel 82 is allowed to turn only in the direction of the arrow by a predetermined angle. This angle of rotation is determined by the action of a depth feed Termination switch 84 which is controlled by a guide plate 85 of the sliding member 75. Reverting to FIG. 6, the shaft 81 of the ratchet wheel 82 is terminated at a gear 86 which is in meshing engagement with a driving gear 87. Between one end of this driving gear 87 and a gear 88 is formed a clutch 89 which is provided with two clutch members 89a, 89b.

When, in operation, a clutch control cylinder 91 pushes its piston rod 92 in the direction of the solid arrow to have the clutch members 89a, 89b engage with each other and subsequently the depth control cylinder 73 is caused to initiate its operation, then the ratchet pawl 78 allows the ratchet wheel 82 to rotate by a predetermined angle determined by the tooth space of the wheel 82. This rotational motion is then transmitted to the gear 88 by way of the gears, 86, 87 and the clutch 89, in this sequence. This gear 88 is formed integral with a shaft 93 having its one end threadedly fitted into the depth control table 32, so that, when the gear 88 is turned as in the above, the table 32 is moved forward to make the tool head 17 with the cutting tool 14 approach the arcuate groove 12 of the workpiece 13.

Figure 10:
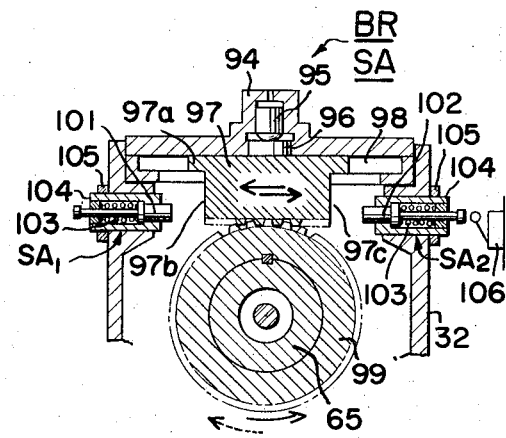
FIG. 10 is a cross-sectional view taken along the line 10 — 10 of FIG. 6.

Reference will now be made to FIGS. 6 and 10, in which a shock absorber mechanism (SA) and a backlash reducing mechanism (BR) are illustrated as partially corelated. The latter mechanism (BR) is provided with a pressure cylinder 94 for biasing at a predetermined pressure level a piston 95 toward the hollow shaft 65. This bias pressure is applied through a pressure member 96 to a brake rack 97 having its projections 97a received in a guide groove 98. Thus, when applied with the bias pressure, the projections 97a are pressed on the inner surface of the guide groove 98, as better shown in FIG. 10. The brake rack 97 is formed with a toothed lower surface, the teeth of which are in meshing engagement with a brake gear 99 secured to the hollow shaft 65. In this way, the gear connections for transmitting the driving force from the motor 36 to the tool head 17 are normally loaded at the brake gear 99 by the above bias pressure through the mechanism (BR), for both the work and return operations of the tool head 17. As a result, the backlash, which might take place between the gear connections without the mechanism (BR), will be materially reduced. At the both sides of said brake rack 97, on the other hand, there are provided two shock absorbers $SA_1$ and $SA_2$, each of which operates at the termination of the feeding or return stroke of the cutting tool 14 to soften the rotational motion of the tool head 17 to thereby reduce such shocks as experienced at the shift points of the arcuate movements of the tool head 17. More specifically, the shock absorbers $SA_1$ and $SA_2$ are provided, respectively, with a rod 101 which is movably received therein for abutting engagement with the left-hand side 97b of the rack 97 at the termination of the feeding operation of the cutting tool 14, and with a rod 102 which is also movably received therein for abutting engagement with the right-hand side 97c of the rack 97 at the termination of the quick-return operation of the tool 14. Moreover, the two rods 101 and 102 are, respectively, biased by springs 103 toward the both sides 97b and 97c of the rack 97. With these arrangements, therefore, the alternate abutments of the sides 97b and 97c of the rack upon the rods 101 and 102 will be damped by the action of the springs 103, so that the shocks at the shift points of the arcuate movements of the tool head 17 are materially reduced. The operational timings of the rods 101 and 102 are adjusted by turning fastening nuts 105 into which cylinders 104 for the rods 101 and 102 are threaded. At the opposite side of the shock absorber $SA_2$ for the return termination, on the other hand, there is provided a switch 106 which is operative to determine completion of the quick-return operation when the cutting tool 14 is quickly returned to a position for initiation of the feeding operation. As shown, the operation of the switch 106 is commenced by the abutment of the rod 102.

Reverting now to FIGS. 6 and 11, the cutting machine 30 of the invention further includes electrical control means. That is, at the left-hand side of a piston rack 107 which is in meshing engagement with the gear 88 of the cutting depth control mechanism CD for effecting return of the whole cutting depth, there is provided a limit switch 108 which is operative at the initial position of the cutting depth feeding of the cutting tool 14 to detect an initial position of insertion in response to the approach of the left end 107a of the piston rack 107. At the right-hand side of the piston rack 107, on the other hand, there is also provided a limit switch 109 which is operative to detect an initial position of drawal in response to the approach of the right end 107b of the rack 107. On the quick approach table 33 is mounted an air micro-switch 111 which is responsive at the termination of the cutting depth feeding operation of the cutting tool 14 to the approach of an operation member 112, which is mounted on the depth control table 32, so as to detect termination of the whole cutting depth feeding. In addition, in the vicinity of the axis of rotation 53 of the speed-varying disc 54 of the Whitworth quick-return mechanism QR, there is provided a switch 113 which is operated at the termination of feeding operation of the cutting tool 14 by an operation member 114, which is secured to the axis 53, so as to detect termination of the feeding operation.

Reference will now be made to FIG. 15, in which an electric circuit EC for electrically controlling the operation of the cutting depth control mechanism CD. The electric circuit EC generally includes the depth feed termination switch 84, switch for detecting completion of the quick-return operation 106, switch for detecting initial position of drawal 109, and switch for detecting termination of the feeding operation 113, among the switches 39, 41, 84, 106, 108, 109, 111 and 113 as have been described. In order to ensure reliable and safe feedings for insertion and cutting, the control operation of the electric circuit EC is carried out in accordance with the stages as follow. The cutting operation of the cutting tool 14 is initiated by a command signal of the foremost position detecting limit switch 39, which is actuated by the action of the locating dog 38 on the quick approach table 33, or by manually pushing a push button 115. By either of these actions, a relay switch for motor MS is energized to drive the electric motor 36 to effect the cutting operation of the tool 14. After that, when the switch 113 which is actuated by the operation member 114 on the axis of the speed-varying disc 54 is brought into operation at the termination of feeding for the cutting operation of the cutting tool 14, then the command signal produced at the switch 113 is transmitted to simultaneously energize first and second oil passage change relays $CR_1$ and $CR_2$ to thereby actuate a solenoid $SoL_1$ of an electro-magnetic valve 116, as better seen in FIG. 11. With the solenoid $SoL_1$ being actuated, the oil passages in the electro-magnetic valve are shifted to move the piston 74 of the depth control cylinder 73 in the leftward direction, as shown in a solid arrow, so as to effect insertion of predetermined stroke of the cutting tool 14. Since the cutting depth feeding operation of the cutting tool 14 is performed, as has been described, in a remarkably short time period of the quick-return operation, the depth control cylinder 73 should complete the particular feeding operation by the time when the cutting tool 14 is returned to the initial position of the feeding operation for cutting. For this purpose, the sliding member 75 of the piston 74 can operate to actuate the depth feed termination switch 84 of left-hand side by way of an operation lever 117, as shown in FIG. 11, to thereby energize a fourth oil passage change relay $CR_4$, on the one hand, and to deenergize the second relay $CR_2$ together with the solenoid $SoL_1$, on the other hand. As a result, the oil passages in the electromagnetic valve 116 are shifted to move the piston 74 rightwardly of the dotted arrow. At this instance, however, it may happen that the piston 74 continues moving in the leftward direction and accordingly is continuously subject to the cutting depth feeding operation irrespective of the fact that the cutting tool 14 has already been quickly returned to the initial position of cutting feeding. This undesirable phenomenon is considered to occur due to pressure variation in the working fluid, which is being supplied to the electro-magnetic valve 116, and/or to variation in resistance to the feeding operation of the cutting depth control mechanism CD. In order to obviate the above phenomenon, the right end 97c of the brake rack 97 is pressed by the pressure cylinder 94 to thereby actuate the switch 106 for detecting completion of the quick-return operation by way of the rod 102. As a result, a third oil passage change relay $Cr_3$ is energized and at the same time the second relay $CR_2$ and the solenoid $SoL_1$ are deenergized, so that the piston 74, which is in the course of the cutting depth feeding operation, is moved rightwardly of the dotted arrow to restore its initial position. This means that the cutting depth feeding operation is temporarily suspended. This temporal suspension is necessary for eliminating causes for deteriorating the correctness of the cutting operation. Because the continuation of the cutting depth feeding operation even at the initiation of the feeding operation for cutting will invite irregularities in cutting of the material to be taken out from the long groove 12 of the workpiece 13. This will be easily reflected by the fact that a subsequent feeding operation for cutting is initiated concurrently with the quick return of the cutting tool 14 to the initial position for the cutting feed.

In the case where the cutting depth feeding operation of the cutting tool 14 is accomplished every time of the quick-return stroke after completion of the cutting feed and for a predetermined times of repetition to obtain the workpiece 13 having the long groove 12 of the predetermined depth, the air micro-switch 111 for detecting termination of the feeding operation is operative to complete the whole cutting operation. When, on the other hand, after adjustment of the cutting tool 14 with respect to the workpiece 13, the cutting tool 14 is fed by the cutting depth toward the workpiece 13 with the limit switch 108 of the piston rack 107 being left unreturned to its operative position, then the right end 107b of the rack 107 will have abutted upon the limit switch 109 without effecting the full feeding of a predetermined cutting depth of the cutting tool 14. The command signal of the limit switch 109 will then energize a confirmation relay $CR_5$ for confirming return depth of cut, to thereby deenergize the relay switch MS, so that the deenergized motor 36 will stop the cutting operation of the workpiece 13 to be effected by the cutting tool 14. At the same time, moreover, the energized confirmation relay $CR_5$ will actuate a buzzer relay $CR_6$ to energize a buzzer BZ which produces a warning signal to the operator. Then, the operator can readjust the relative positional relationship between the cutting tool 14 and the workpiece 13. In other words, as better seen from FIG. 6, the clutch control cylinder 91 is brought into operation to retract the piston rod 92 as well as the gear 88 in the direction of the dotted arrow, so that the clutch 89 is released. As shown in FIG. 11, on the other hand, a pressure cylinder 118 for effecting full return of the cutting depth is also brought into operation to move the piston rack 107 in the leftward direction of return stroke to an extent that the left end 107a of the rack 107 can operate the limit switch 108. Then, the limit switch 108 thus actuated will deenergize the buzzer relay $CR_6$ to stop the warning signal of the buzzer BZ. After this, the distance between the air microswitch 111 and the operation member is readjusted to have a value of the required depth of cut. In this way, by the action of the clutch control cylinder 91, both the piston rod 92 and the gear 88 are moved forward in the direction of the solid arrow to close the clutch 89. This action is accompanied by that a manual control handle 119, which is secured to the shaft 81 of the ratchet wheel 82 as shown in FIGS. 6 and 11, is manually turned to move the depth control table 32 in the forward direction of the solid arrow to an extent that the blade edge of the cutting tool 14 is positioned in the vicinity of the long groove 12 of the workpiece 13 (the distance inbetween being, for example, 0.1 mm). Thus, the readjustment of the cutting tool 14 has been accomplished. After these consecutive operations, the push button 115 is manually pushed to drive the electric motor 36, thus reopening the cutting operation of the workpiece 13 by the cutting tool 14. As an alternative, the switch 106, which is operative by the action of the brake rack 97 on the tool head 17 so as to confirm completion of the quick return, may be operated by an operation member other than the operation member 114. The additional member is also disposed in the vicinity of the shaft end of the speed-varying disc 54 and mounted on the one end of the axis of rotation 53.

Figure 13:
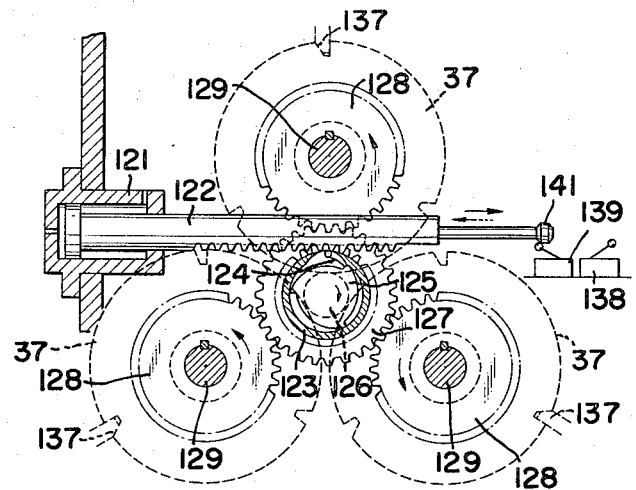
FIG. 13 is a cross-sectional view taken along the line 13 — 13 of FIG. 6.

Turning now to FIGS. 13 and 14 in addition to FIG. 6, the rotary table dividing mechanism TC is operative to divisionally rotate in sequence the dividing tables 37 which are the same in number as the cutting tools 14 and which are disposed facing the tools 14. By the actions of the electric motor 36 and the cutting depth control mechanism CD, the formation of a groove 12 in the workpiece 13 is finished, and then a table dividing cylinder 121 is brought into operation to reciprocate a piston rack 122 in the directions of the arrows to thereby effect reciprocal rotations of a driving gear 123. As a result, a feed pawl 124 which is journaled to the driving gear 123 is accordingly rotated to advance a free wheel 125 in the direction of the solid arrow. This advance motion is then transmitted to its free wheel shaft 126, and then to a gear 127 formed integral with the shaft 126. The advance motion is further transmitted to each of driven gears 128 which are in meshing engagement with the gear 127. Thus, each of the driven gears 128 is rotated in the direction of the arrow, so that the workpiece 13 together with the dividing tables 37, which are respectively secured to table dividing shafts 129 of the driven gears 128, are advanced in the direction of the arrow by a predetermined angle (120 degrees for the embodiment as shown in FIGS. 13 and 14.

The dividing table 37 has its inner tapered thrust portion 131 fittedly secured to a counter-tapered socket 132 of the work head 35 by means of a locking cylinder 133 which is mounted on the table dividing shaft 129, as shown in FIG. 6. Into locating grooves 134 which are formed in the outer periphery of the dividing table 37 at a predetermined spacing from each other, on the other hand, are inserted corresponding locating pins 137 each of which is secured to corresponding pistons 136, as shown in FIGS. 13 and 14. These pistons 136 are movably received within corresponding locating cylinders 135, as seen from FIG. 14. By the insertion of the locating pins 137 into the corresponding grooves 134, the angular positions of the dividing tables 37 are thus correctly determined.

Reverting to FIG. 13, at an extension of the piston rack 122 of the table dividing cylinder 121, there are provided a limit switch 138 for detecting the dividing operation, and a first table dividing cam 141 which is operable to actuate a limit switch 139 for detecting completion of the dividing operation. When the table dividing cam 141 actuates the limit switch 139, therefore, a suitable fluid control circuit (not shown) for regulating pressurized fluid to be supplied to the table dividing cylinder 121 is brought into operation to retract the piston rack 122 in the direction of the dotted arrow. Then, the table dividing cam 141 actuates the limit switch 139, and the fluid control circuit confirms completion of the divisional rotation of the dividing table 37 to produce another command signal.

As shown in FIG. 14, on the piston 136 of the locating cylinder 135, there are also provided a limit switch 142 which is operative to control the table dividing cylinder 121 to confirm the position of the dividing table 37, and a locating cam 144 which is operative to actuate a limit switch 143 for detecting release of the locating operation. When the locating cam 144 actuates the limit switch 142, this switch 142 will produce a command signal indicating completion of the locating operation by which the dividing table 37 is located at a predetermined angular position. When, on the other hand, the locating cam 144 actuates the limit switch 143, then another command signal is produced which indicates that the locating pin 137 has already been drawn from each of the locating groove 134.

Referring back to the left side of FIG. 6, a limit switch 145 for detecting completion of the dividing operation is provided which is brought into operation by a second table dividing cam 146 mounted on the free wheel shaft 126. When actuated by the second cam 146, the limit switch 145 will generate a command signal which dictates termination of the divisional rotations of a predetermined number of the dividing table 37.

Figure 7:
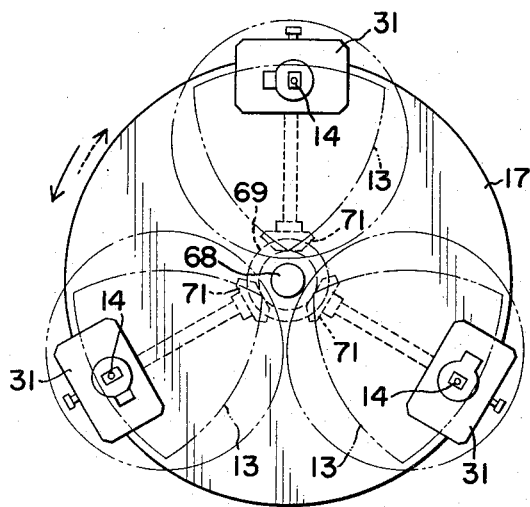
FIG. 7 is a front elevation taken along the line 7 — 7 of FIG. 6.

When, in the overall operation, it is intended to cut an arcuate groove in the side peripheral surface of the workpiece 13 attached to the dividing table 37 of the work head 35, then the quick approach cylinder 34 is brought into operation to move forward the depth control table 32 together with the quick approach table 33 so that the cutting tool 14 of the tool head 17 is quickly approached until the vicinity of the workpiece 13, as shown in FIGS. 6 and 7. Thus, the locating dog 38 of the approach table 33 renders the limit switch 39 conductive to produce a command signal, which in turn drive the electric motor 36 on the depth control table 32. With the electric motor 36 being driven, the cutting tool 14 as well as the tool head 17 starts the arcuate swinging motions in the directions of the arrows of FIG. 7, by means of the Whitworth quick return mechanism QR. At the same time, the rotary cam mechanism RC is also brought into operation to insert the cutting tool 14 into the relief space 10 formed in one end of the arcuate groove 12 and to draw the same from the relief space 11 formed in the same from the relief 11 in the other side. In the quick-return stroke of the cutting tool 14 in the dotted arrow, moreover, the cutting depth control mechanism CD undergoes its operation to feed the tool 14 by a predetermined cut depth. After the above cutting cycle has been repeated required times to produce an arcuate groove 12 of required dimensions, the air micro-switch 111 begins its operation to actuate the clutch control cylinder 91 and the cylinder 118 of the cutting depth control mechanism CD as well as the locating cylinder 135 of the work head 35. As a result, the clutch 89 is opened to effect the whole return of cut of the cutting tool 14, in which operation the depth control table 32 is retreated by the piston rack 107, and to effect release of the positioning of the dividing table 37 so as to draw the locating pin 137 from the locating notch 134 of each of the dividing tables 37. Subsequently, the locating cam 144 renders the limit switch 143 conductive to produce a command signal which actuates the locking cylinder 133, to thereby release the dividing table 37 from the counter-tapered socket 132 and at the same to bring the table dividing cylinder 121 into operation so that all of the dividing tables 37 are simultaneously turned by a predetermined angle for division. After this dividing operation, the limit switch 139 is actuated by the action of the table dividing cam 141 of the piston rack 122 to thereby bring the locating cylinder 117 into operation, so that the locating pin 137 is inserted into the tapered thrust portion 131 of the dividing table 37 so as to position of the table 37. After this positioning operation, the locating cam 144 actuates the limit switch 142 to produce a command signal by which the locking cylinder 133 is brought into operation to retain the dividing table 37 in the counter-tapered socket 132.

After the positioning of the dividing table 37 has been completed, on the other hand, the command signal of the limit switch 142 will drive again the electric motor 36 on the depth control table 32, thus repeating the above-described cutting operation so as to newly form an arcuate groove.

As has been described in detail in the above, the present invention can provide a method and an apparatus for cutting a desired number of arcuate grooves in the side surfaces of the workpiece 13 by repeatedly performing the cutting operations and the dividing operations. After the ultimate dividing operation for the cutting operation, however, the second table dividing cam 146 on the free wheel shaft 126 of the table dividing mechanism TC renders the limit switch 145 conductive to generate a command signal which is transmitted to the not-shown electric control circuit. With these wiring arrangements, after the final cutting operation, the switch 106 is rendered conductive without resultantly effecting the subsequent dividing operation. In place of the dividing operation, the B contact for completion of the cutting operation CRX is opened to stop driving of the electric motor 36. At the same time, the quick approach cylinder 34 is actuated to retreat the quick approach table 33 until the locating dog 38 actuates the limit switch 41, so that the cutting tool 14 is departed from the workpiece 13 together with the tool head 17 of the depth control table 32.

At the final stage, the workpiece 13 formed with the complete arcuate grooves is removed from the dividing table 37 and subsequently substituted therefor by a new workpiece to be cut. In this way, the cutting operation of the arcuate grooves can be carried out efficiently and continuously without considerable interruptions.

What is claimed is:

1. An apparatus for forming a long groove in a workpiece between relief spaces having such a limited length as barely receives a cutting tool, said apparatus comprising:

holding means slidably receiving the main body of the cutting tool for allowing the cutting tool to move toward and away from the relief spaces in the workpiece and reciprocally movable together with the cutting tool along and at a spacing from the long groove;

feeding and returning means driven by a prime mover for feeding the cutting tool with its blade moving in and along the long groove and for quickly returning the cutting tool with its blade moving along and at a spacing from the long groove; and control means mounted in said holding means and driven by a prime mover for drawing the cutting tool from one of the relief spaces at a final stage of the feeding operation, for returning the cutting tool at the same time of the drawing operation to compensate the velocity vector of said feeding operation, for inserting the cutting tool into the other of the relief spaces at a final stage of the returning operation of said feeding and returning means, and for feeding the cutting tool at the same time of the inserting operation to compensate the velocity vector of the returning operation of said feeding and returning means, so that the cutting tool can move for drawal and insertion substantially perpendicularly of the long groove at the final stages of the feeding and returning operations of said feeding and returning means.

2. An apparatus according to claim 1, further comprising carrying means carrying said holding means and movable toward and away from the long groove.

3. An apparatus according to claim 1, wherein said control means has a guide line inclined with respect to a line perpendicular to the long groove for producing the velocity vector components which compensate the velocity vectors of the feeding and returning operations of said feeding and returning operations.

4. An apparatus according to claim 1, further comprising:

depth-feeding means for depth-feeding the cutting tool together with said holding means by a predetermined depth of cut; and approach control means for moving the cutting tool together with said holding means between its foremost position, in which said cutting tool is located in the proximity of the outer surface of the workpiece, and its rearmost position in which said cutting tool is located rearmost from said outer surface.

5. An apparatus for continuously forming a plurality of arcuately long grooves in a workpiece between paired relief spaces having such a limited length as barely receives a cutting tool, said apparatus comprising:

holding means slidably receiving the main body of the cutting tool for allowing the cutting tool to move toward and away from one pair the relief spaces in the workpiece and reciprocally swingably movable together with the cutting tool along and at a spacing from one of the long grooves;

feeding and returning means driven by a prime mover for feeding the cutting tool with its blade moving in and along said one of the long grooves and for quickly returning the cutting tool with its blade moving along and at a spacing from said one of the long grooves;

control means mounted in said holding means and driven by a prime mover for drawing the cutting tool from one of the paired relief spaces at a final stage of the feeding operation, for returning the cutting tool at the same time of the drawing operation to compensate the velocity vector of said feeding operation, for inserting the cutting tool into the other of the paired relief spaces at a final stage of the returning operation of said feeding and returning means, and for feeding the cutting tool at the same time of the inserting operation to compensate the velocity vector of the returning operation of said feeding and returning means, so that the cutting tool can move for drawal and insertion substantially perpendicularly of said one of the long grooves at the final stages of the feeding and returning operations of said feeding and returning means; and shaft means connected in a rotational force transmitting relationship between the central portion of said holding means and the output of said feeding and returning means for reciprocally swinging thereabout the cutting tool together with said holding means for the cutting operation.

6. An apparatus according to claim 5, further comprising carrying means carrying said holding means and movable toward and away from said one of the long grooves.

7. An apparatus according to claim 5, wherein said control means has a guide line inclined at said paired relief spaces with respect to a line perpendicular to the tangential lines to said one of the long grooves for producing the velocity vector components which compensate the velocity vectors of the feeding and returning operations of said feeding and returning operations.

8. An apparatus according to claim 5, further comprising:

gear means secured to said shaft means for reciprocal rotation;

rack means meshing with said gear means for reciprocal movement;

thrust means engaging with said rack means for applying thereto a braking thrust of a predetermined strength to reduce backlash thereat between any gearing connection of the apparatus; and a pair of shock absorbing means disposed sideways of said rack means for absorbing such shocks as are experienced, respectively, at the final stages of the feeding and returning operations of said feeding and returning means.

9. An apparatus according to claim 5, further comprising:

a dividing table securing thereto the workpiece and formed at its periphery with locating notches which correspond in number to the long grooves;

dividing means for rotating said dividing table by a predetermined angle for division when the cutting operation of said one of the long grooves has been finished;

locating means engageable with one of the locating notches of said dividing table for angularly locating the latter in position; and locking means for axially locking said dividing table in position.

10. An apparatus for continuously cutting a plurality of side seal grooves in a rotor of a rotary piston engine between paired relief spaces having such a limited length as barely receives a cutting tool, said apparatus comprising:

holding means slidably receiving the main body of the cutting tool for allowing the cutting tool to move toward and away from one pair of relief spaces in the rotor and reciprocally swingably movable together with the cutting tool along and at a spacing from one of the side seal grooves;

feeding and returning means driven by a prime mover for feeding the cutting tool with its blade moving in and along said one of the side seal grooves and for quickly returning the cutting tool with its blade moving along and at a spacing from said one of the side seal grooves;

control means mounted in said holding means and driven by a prime mover for drawing the cutting tool from one of the paired relief spaces at a final stage of the feeding operation, for returning the cutting tool at the same time of the drawing operation to compensate the velocity vector of said feeding operation, for inserting the cutting tool into the other of the paired relief spaces at a final stage of the returning operation of said feeding and returning means, and for feeding the cutting tool at the same time of the inserting operation to compensate the velocity vector of the returning operation of said feeding and returning means, so that the cutting tool can move for drawal and insertion substantially perpendicularly of said one of the side seal grooves at the final stages of the feeding and returning operations of the feeding and returning means; and shaft means connected in a rotational force transmitting relationship between the central portion of said holding means and the output of said feeding and returning means for reciprocally swinging thereabout the cutting tool together with said holding means for the cutting operation.

11. An apparatus according to claim 10, further comprising carrying means carrying said holding means and movable toward and away from said one of the side seal grooves.

12. An apparatus according to claim 10, wherein said control means has a guide line inclined at said paired relief spaces with respect to a line perpendicular to the tangential lines to said one of the side seal grooves for producing the velocity vector components which compensate the velocity vectors of the feeding and returning operations of said feeding and returning operations.

13. An apparatus according to claim 10, further comprising:

gear means secured to said shaft means for reciprocal rotation;

rack means meshing with said gear means for reciprocal movement;

thrust means engaging with said rack means for applying thereto a braking thrust of a predetermined strength to reduce backlash there at between any gearing connection of the apparatus; and a pair of shock absorbing means disposed sideways of said rack means for absorbing such shocks as are experienced, respectively, at the final stages of the feeding and returning operations of said feeding and returning means.

14. An apparatus according to claim 10, further comprising:

a dividing table securing thereto the rotor and formed at its periphery with locating notches which correspond in number to the side seal grooves;

dividing means for rotating said dividing table by a predetermined angle for division when the cutting operation of said one of the side seal grooves has been finished;
locating means engageable with one of the locating notches of said dividing table for angularly locating the latter in position; and
locking means for axially locking said dividing table in position.

* * * * *

UNITED STATES PATENT OFFICE
CERTIFICATE OF CORRECTION

Patent No. 3,800,661    Dated April 2, 1974

Inventor(s) Shitomi Omonishi

It is certified that error appears in the above-identified patent and that said Letters Patent are hereby corrected as shown below:

The inventor's address is:

-- 7-25, 2-chome, Yoshijima-nishi
   Hiroshima-shi, Hiroshima-ken
   Japan --

Signed and sealed this 8th day of October 1974.

(SEAL)
Attest:

McCOY M. GIBSON JR.          C. MARSHALL DANN
Attesting Officer            Commissioner of Patents

UNITED STATES PATENT OFFICE
CERTIFICATE OF CORRECTION

Patent No. 3,800,661  Dated April 2, 1974

Inventor(s) SHITOMI OMONISHI

It is certified that error appears in the above-identified patent and that said Letters Patent are hereby corrected as shown below:

Title page insert: "Assigned to TOYO KOGYO CO., LTD., Aki-gun, Hiroshima-ken, Japan Signed and sealed this 11th day of March 1975.

(SEAL)
Attest:

RUTH C. MASON
Attesting Officer

C. MARSHALL DANN
Commissioner of Patents
and Trademarks